(12) United States Patent
Conway

(10) Patent No.: US 6,332,205 B1
(45) Date of Patent: Dec. 18, 2001

(54) DATA RECOVERY SYSTEM HAVING OFFSET COMPENSATION

(75) Inventor: Thomas Conway, Boulder, CO (US)

(73) Assignee: STMicroelectronics N.V. (NL)

( * ) Notice: Subject to any disclaimer, the term of this patent is extended or adjusted under 35 U.S.C. 154(b) by 0 days.

(21) Appl. No.: 09/207,245

(22) Filed: Dec. 8, 1998

(51) Int. Cl.[7] .......................... G06F 11/00; G06F 11/30; G11B 5/09; G11B 15/04

(52) U.S. Cl. .............................. 714/746; 360/45; 360/65

(58) Field of Search .................................. 714/746, 760, 714/794, 716; 360/45, 39, 46, 55, 65; 375/229, 233, 240, 241, 259, 262, 341

(56) References Cited

U.S. PATENT DOCUMENTS

| | | | |
|---|---|---|---|
| 5,459,679 | * 10/1995 | Ziperovich | 708/3 |
| 5,583,706 | * 12/1996 | Dudley et al. | 360/46 |
| 5,828,476 | * 10/1998 | Bonebright et al. | 359/152 |
| 5,991,107 | * 11/1999 | Behrens et al. | 360/46 |

OTHER PUBLICATIONS

"A CMOS 260Mbps Read Channel with EPRML Performance", Thomas Conway et al., Analog Devices, pp. 1–4.

* cited by examiner

Primary Examiner—Christine T. Tu
(74) Attorney, Agent, or Firm—Lisa K. Jorgenson; James H. Morris

(57) ABSTRACT

A data recovery system wherein the data is represented by a sequence of data pulses comprising a predetermined sequence of preamble pulses followed by the sequence of data pulses. The data pulses have desired data pulses and a DC offset component, each one of such data pulses having during the preamble acquisition mode a predetermined period. The system includes a clock for producing clock pulses at a predetermined rate and a negative feedback loop. The negative feedback loop includes a differencing network fed by the data pulses and a feedback signal representative of the DC offset component. The differencing network removes the DC offset component from the data pulses to produce output signal representative of the desired data pulses.

3 Claims, 5 Drawing Sheets

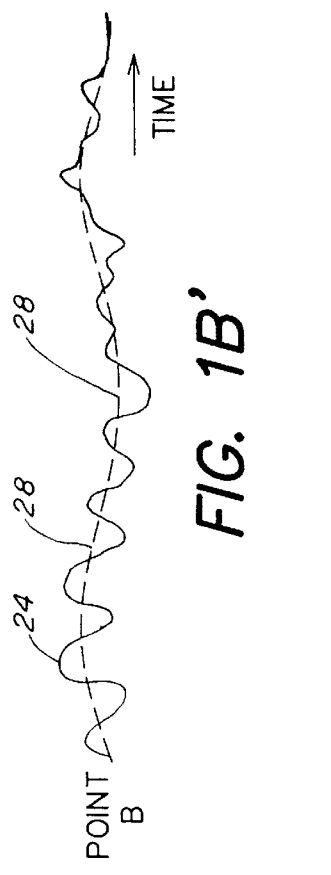
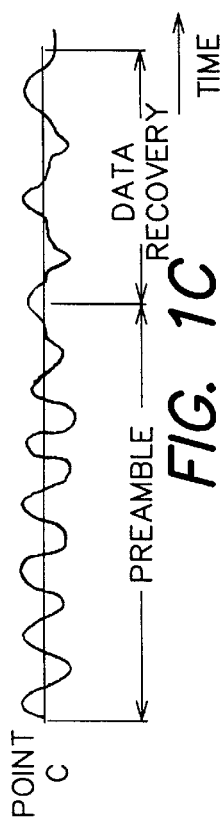
FIG. 1B'
FIG. 1C
FIG. 1D
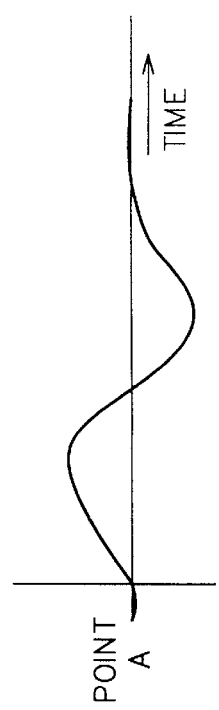
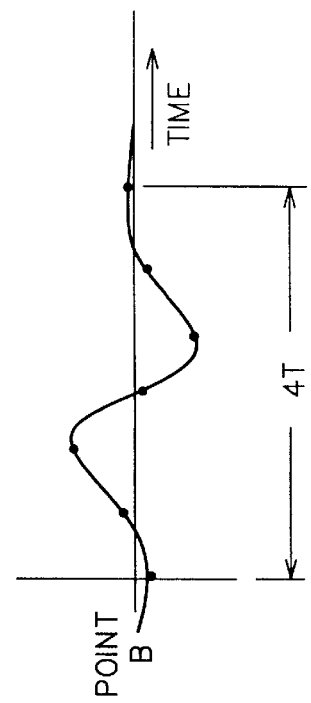
FIG. 1A
FIG. 1B

PREAMBLE/DATA

RESET

CLK

CLK4

DATA RECOVERY SYSTEM HAVING OFFSET COMPENSATION

BACKGROUND OF THE INVENTION

This invention relates generally to data recovery systems and more particularly to systems utilizing partial response maximum-likelihood (PRML) detection.

Data recovery systems are used in a variety of applications. In one application, such system is used to recover (i.e., read) data stored on a magnetic disk of the type used as hard drives in computer data storage systems. In one type of such data storage system, a predetermined preamble pattern is written onto the magnetic disk before the start of any block of data to be stored. The preamble pattern is used during the read operation to acquire initial gain, frequency and phase lock to the data read from the disk. Thus, when data is read from the disk, the preamble is used by the read channel during a preamble recovery mode to obtain clock (i.e., sampling or timing) pulses for a subsequent data recovery mode.

The data read from the magnetic disk is passed through an analog equalization filter prior to passing to succeeding stages of the data recovery system. The analog equalization filter is configured to shape the sequence of preamble pulses and data pulses into pulses having a predetermined waveform characteristic. The analog equalization filter has a non-linear change in phase as a function of frequency characteristic. The analog equalization filter produces pulses that are fed to an analog to digital converter. The analog-to-digital converter converts samples of the shaped pulses into corresponding digital words in response to the clock pulses (i.e., sampling pulses) fed to a clock input of the converter. One such arrangement is shown in U.S. Pat. No. 5,220,466.

Direct current (DC) offsets may be introduced into the data recovery process by analog signal processing circuitry, such as amplifiers and filters. The DC offsets of theses devices may vary as a function of temperature and signal gain. The DC offset associated with these non-ideal devices results in a signal level shift which, if uncorrected can degrade performance of the data recovery system. One technique suggested to compensate for this DC offset is discussed in U.S. Pat. No. 5,459,679.

SUMMARY OF THE INVENTION

In accordance with one feature of the invention, a data recovery system is provided. The data is represented by a sequence of data pulses comprising a predetermined sequence of preamble pulses fed to the system during a preamble acquisition mode followed by the sequence of data pulses fed to the system during a subsequent data recovery mode. The data pulses have desired data pulses and a DC offset component. The system includes a negative feedback loop, having a differencing network fed by the data pulses and a feedback signal representative of the DC offset component. The differencing network removes the DC offset component in response to only actual values of data pulses fed thereto during the preamble acquisition mode and in response to both actual data pulses and estimated values of such data pulses fed thereto during the data recovery mode.

In accordance with another feature of the invention, a data recovery system is provided wherein the data is represented by a sequence of pulses comprising a predetermined sequence of preamble pulses fed to the system during a preamble acquisition mode followed by the sequence of data pulses fed to the system during a subsequent data recovery mode. The data pulses have desired data pulses and a time varying DC offset component. Each one of such data pulses during the preamble acquisition mode has a predetermined period, 4T. The system includes a source of clock pulses produced at a predetermined rate, R, where R=1/T. A negative feedback loop is provided for cancelling the DC offset component. The negative feedback loop includes a differencing network fed by the data pulses and a feedback signal representative of the DC offset component. The differencing network removes the DC offset component from the data pulses fed thereto to produce a difference signal representative of the desired data pulses. The feedback loop includes an analog to digital converter fed by the output signal and the clock pulses for converting samples of such output signals into corresponding digital words in response to the clock pulses. An integrator is fed by the digital words converted by the analog to digital converter and by the clock pulses for cumulating algebraically adding the digital words fed thereto in response to the clock pulses. A gate is provided for selectively successively coupling to an output of the gate each Nth digital word fed to such gate by the integrator, where N is an integer greater than one. The gate inhibits from such output other ones of the digital words. A digital to analog converter is fed by the digital words coupled to the output of the gate for converting such digital words into a corresponding analog signal to provide the feedback signal for the differencing network.

BRIEF DESCRIPTION OF THE DRAWING

Other features of the invention as well as the invention itself will become more readily apparent from the following detailed description when taken together from the following drawings, in which:

FIGS. 1A, 1B, 1B', 1C and 1D are timing diagrams of signals at various points in the system of FIG. 1;

DETAILED DESCRIPTION OF THE PREFERRED EMBODIMENTS

Figure 1:
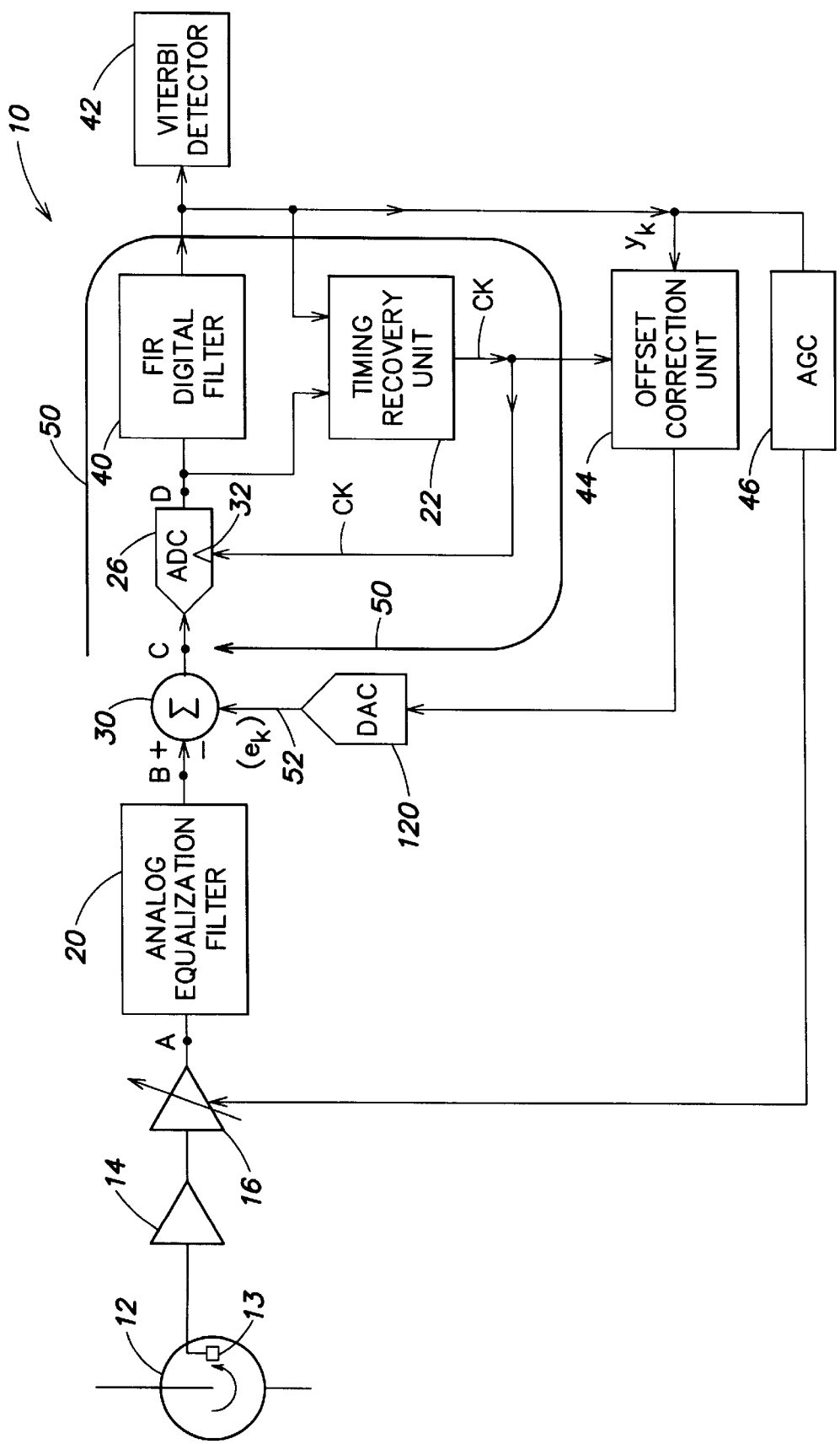
FIG. 1 is a data recovery system according to the invention.

Referring now to FIG. 1, a block diagram of a data recovery system 10 is shown. The system 10 is used to recover data that is stored on a magnetic disk 12. The magnetic disk 12 rotates relative to a magnetic field detecting head 13 and data stored on the disk 12 is converted by the head 13 into data pulses. The data are read from the disk and passed through a preamplifier 14 and variable gain amplifier 16 as shown. An exemplary bit of data will have waveforms as shown in FIG. 1A after passing through the preamplifier 14 and variable gain amplifier 16. (It should be understood that, in practice, as with a class 4 partial response (PR4) data recovery system, more that one bit of binary data is read from the disk 12 within the time duration of the pulse produced from a single bit. Here, each data pulse has a time duration 4T.)

The output of the variable gain amplifier 16 is fed to an analog equalization filter 20. The analog equalization filter 20 is configured to shape the sequence of data pulses into pulses having a predetermined waveform characteristic. The analog equalization filter 20 has a non-linear change in phase as a function of frequency characteristic. The output of the analog equalization filter 20 (i.e., point B) for the exemplary isolated bit of FIG. 1A, is shown in FIG. 1B, and for a sequence of preamble data pulses followed by a sequence of data pulses is shown in FIG. 1B'.

The data pulses produced at the output of the analog equalization filter 20 have an initial preamble calibration sequence followed by a data sequence that is to be recovered. Thus, when data is read from the disk 12, the preamble is used by a read channel of the storage system (not shown) during the preamble recovery mode (i.e., during the preamble calibration phase) to obtain clock (i.e., sampling or timing) pulses "CK" for a subsequent data recovery mode in a timing recovery unit 22 here of the type described in co-pending patent application entitled "DATA RECOVERY SYSTEM", assigned to the same assignee as the present patent application and filed on the same date as this application, the entire subject matter thereof being incorporated into this application by reference. Suffice it here to say that the data pulses read from the disk 12 have desired data pulses indicated by the solid line 24 in FIG. 1B' and a time varying DC offset component indicated by the dotted line 26 in FIG. 1B'.

The output of the analog equalization filter 20 is fed to a digital to analog converter 28 though a differencing network 30, as shown. Also fed to the differencing network 30 is a feedback signal on line 52. As will be described in more detail below, the signal on line 52 represents the time varying DC offset component of the data pulses fed to the differencing network 30 by the analog equalization filter 20. Thus, the output of the differencing network 30 (i.e., point C) is a compensated difference signal which includes the desired data pulses, as shown in FIG. 1C.

The analog to digital converter 26 converts samples of the desired data pulses into corresponding digital words (Point D) in response to clock pulses (CK) fed to a clock input 32 of the converter 26, as shown in FIG. 1D. The clock pulses CK are produced by a timing recovery unit 22, here of the type described in the above-referenced co-pending patent application. More particularly, the timing recovery unit 22 is provided to produce the clock pulses CK in a way which accounts for variations in the spin rate of the disk 12 relative to the head 13. The preamble, as noted above, is a predetermined sequence of bits written at a predetermined fixed rate, or preamble frequency, $f_p$, and may be represented as:

$$y(t) = 2\sqrt{2} \, \text{SIN} \frac{2\pi t}{4T}$$

where t is time.

During a read operation, the preamble is used by the timing recovery unit 22 to lock the frequency of the clock pulses CK fed to the analog to digital converter 32 to the preamble frequency, $f_p$, and also to lock the phase of the clock pulses CK to a predetermined phase of the preamble frequency, $f_p$. This timing recovery operation is described in the above referenced co-pending patent application. Suffice it to say here, however, that during the steady-state portion of the preamble phase (FIG. 1D), the clock pulses CK should be synchronized with the desired data pulses such that there are two samples of equal magnitude during the first half cycle of a preamble data pulse and two samples of equal magnitude during last half cycle of such preamble data pulse, as shown in FIG. 1D, where T is the period of the clock pulses CK when phase locked.

Thus, the output samples of the analog to digital converter 26 (i.e., at point D) are shown in FIG. 1D. Here, as noted above, it is desired to have four samples of each preamble cycle or period. Thus, here ideally the clock pulses (CK) have a frequency of 1/T.

The output of the analog to digital converter 26 is fed to an asymmetric digital filter 40, here a finite impulse response (FIR) filter. The filter 40 has coefficients selected to compensate for the non-linear change in phase as a function of frequency characteristic of the analog equalization filter 20 as described in the above-referenced co-pending patent application. The digital words, $y_k$, produced by the output of the FIR digital filter 40 at the clock rate CK, are fed to: a Viterbi detector 42 which produces the recovered data $x_k$. The digital words of $y_k$ are also fed to an offset correction unit 44 to produce the error correction signal for the differencing network. The output of the offset correction unit 44 is fed to the differencing network 30 through a digital to analog converter 120 to provide on line 52 the feedback signal representative of the time varying DC offset component. The digital words are also fed to an automatic gain control circuit 46 for variable gain amplifier 14.

During the data recovery phase, the sampling of the analog to digital converter 26 is phase locked to the input signal (Point C) fed to the converter 26. In the ideal case, i.e., no noise or DC offset, the FIR filter 40 produces the signal, $y_k$, with one of three levels, e.g., $y_k=+2.0$; $y_k=-2.0$; or $y_k=0$. In practice, however, there will be noise, so an expected value $\hat{y}_k$ is calculated based on the actual value of $y_k$, as follows:

$$\hat{y}_k = +2 \text{ if } y_k \text{ is greater than } +1.0;$$
$$= -2 \text{ if } y_k \text{ is less than } -1.0;$$
$$= 0, \text{ otherwise.}$$

An error signal, $e_k$, can be used to determine the difference between the estimate value and the actual value; i.e., $e_k=\hat{y}_k-y_k$. Normally, with only noise, the noise will have an average value of zero and hence $e_k$ will after an averaging process be equal to zero. However, with a DC offset, $e_k$ represents the DC offset indicated by the dotted line 26 in FIG. 1B'. By averaging $e_k$ over a period of time greater than the reciprocal of the bandwidth of the noise, as by integration, the noise will be averaged out but the DC offset will remain and can be used to cancel the DC offset component in the data pulses. However, during the initial transient portion of the preamble acquisition mode (FIG. 1D), the system is not phase locked so that it does not know where the sampling is on the data pulse. Consequently, the estimate $\hat{y}_k$ is not known accurately. Thus, as shown in FIG. 1D, samples $S_1$ and $S_2$ have different amplitudes and samples $S_3$ and $S_4$ have different amplitudes and sample $S_5$ and $S_6$ have different amplitudes during the transient portion of the preamble phase. It is noted that during the steady-state portion of the preamble phase, the samples $S_7$ and $S_8$ have the same amplitude, the samples $S_9$ and $S_{10}$ have the same amplitude, etc, until the end of the preamble phase. Thus, instead of using the calculation set forth above to determine the estimate $\hat{y}_k$ in computing $e_k=y_k-\hat{y}_k$ the system 10 determines an error $e'_k=-y_k$ during the preamble phase.

Further, the input to the digital to analog converter 120 is updated every Nth, here every fourth clock pulse CK (i.e., N=4), the system being reset before the start of the preamble acquisition phase. Thus, during the preamble acquisition mode, an error signal $e'_k$ is used to cancel the DC offset and during the data acquisition mode the error signal $e_k$ is used to cancel the DC offset.

Figure 2:
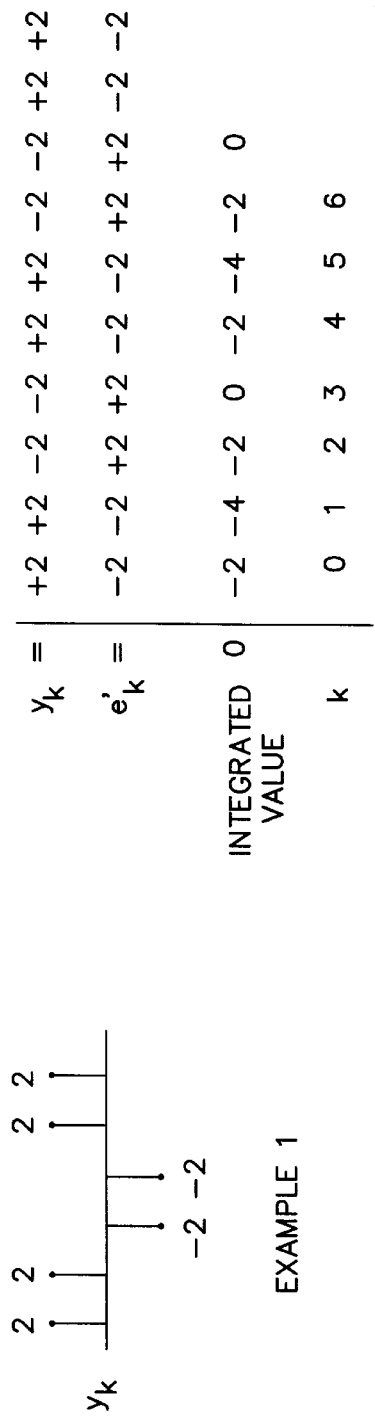
FIG. 2 is a drawing useful in understanding the DC offset feature of the system of FIG. 1 where a zero offset and perfect phase lock condition exists during the preamble phase of the system operation.

Referring now to FIG. 2, an example of samples with no DC offset and with a proper sampling of $y_k$, i.e., samples $S_A$ and samples $S_B$ in the first half cycle of a preamble pulse are equal to each other and samples $S_C$ and samples $S_D$ in the second half cycle of a preamble pulse are equal to each other the amplitudes of two samples is shown. Thus, the samples, $y_k$, are +2, +2, −2, −2, +2, +2, −2, −2, . . . The values of $e'_k=-y_k$ are −2, −2, +2, +2, −2, −2, +2, +2, . . . and the integration of error samples ($e'_k$) after each clock pulse CK is −2, −4, −2, 0, −2, −4, −2, 0 . . . Thus, it is noted that the integration result is 0 after each fourth clock pulse CK, assuming no d.c. offset and that the first clock pulse CK is phase locked to the preamble data pulse.

Figure 3:
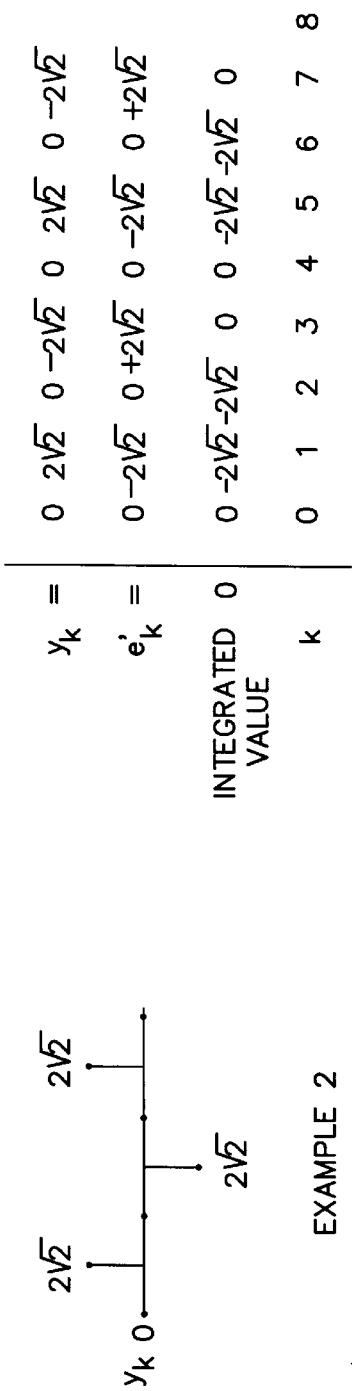
FIG. 3 is a drawing useful in understanding the DC offset feature of the system of FIG. 1 where a zero offset and imperfect phase lock condition exists during the preamble phase of the system operation.

Referring now to FIG. 3, an example of samples with again no DC offset but improper sampling, (i.e., the clock pulses CK are shifted ninety degrees from the example shown in FIG. 2) is shown. The sample ($S_A$) is 0 and sample $S_B$ is 2√2. Likewise, sample $S_C$ is 0 and sample $S_D$ is 2√2 and so forth. Thus, in this example, the values of $e'_k=-y_k$ are 0, −1.4, 0, 1.4, 0, −1.4, . . . The integration of $e'_k$ will be, at each clock pulse CK, 0, −1.4, −1.4, 0, 0, −1.4, −1.4, 0 . . . It is noted that here again that the integration result is 0 after each fourth clock pulse CK, assuming no d.c. offset and the first clock pulse CK is not phase locked to the preamble data pulse. Thus, at both extremes, i.e., perfect phase lock and "perfect non-phase lock", the integration of $e'_k$ results in a 0 at each fourth clock pulse CK with an assumed zero DC offset condition. Therefore, if the value of the integration at each fourth clock pulse is something other than zero, this non-zero value can be attributable to a DC offset. Hence, the value of the integration at each fourth clock pulse CK represents the DC offset and is used as the feedback signal on line 52 (FIG. 1) to cancel the DC offset component of the data pulses fed to the differencing network 30.

More particularly, the data recovery system 10 includes a negative feedback loop 50 for cancelling the DC offset component of the data pulses read from the disk 12. As noted above, the data read from the disk 12 is represented by a sequence of data pulses comprising a predetermined sequence of preamble pulses fed to the data recovery system during a preamble acquisition mode followed by the sequence of data pulses fed to the system during a subsequent data recovery mode. As shown and discussed in connection with FIG. 1B', the data pulses have desired data pulses, as indicated by the solid line 24, and the DC offset component indicated by the dotted line 26. Each one of the data pulses has during the preamble acquisition mode, as noted above, a predetermined period, 4T. The data recovery system 10 includes a source of clock pulses, CK, here the timing recovery unit 22, for producing clock pulses CK at a predetermined rate, R, where R=1/T. Also, included in the negative feedback loop 50 is the differencing network 30 fed by the data pulses produced by the equalization filter 26 and a feedback signal on line 52 representative of the DC offset component produced by the offset correction unit 44. The differencing network 30 removes the DC offset component from the data pulses fed thereto to produce output signal representative of the desired data pulses.

Figure 4:
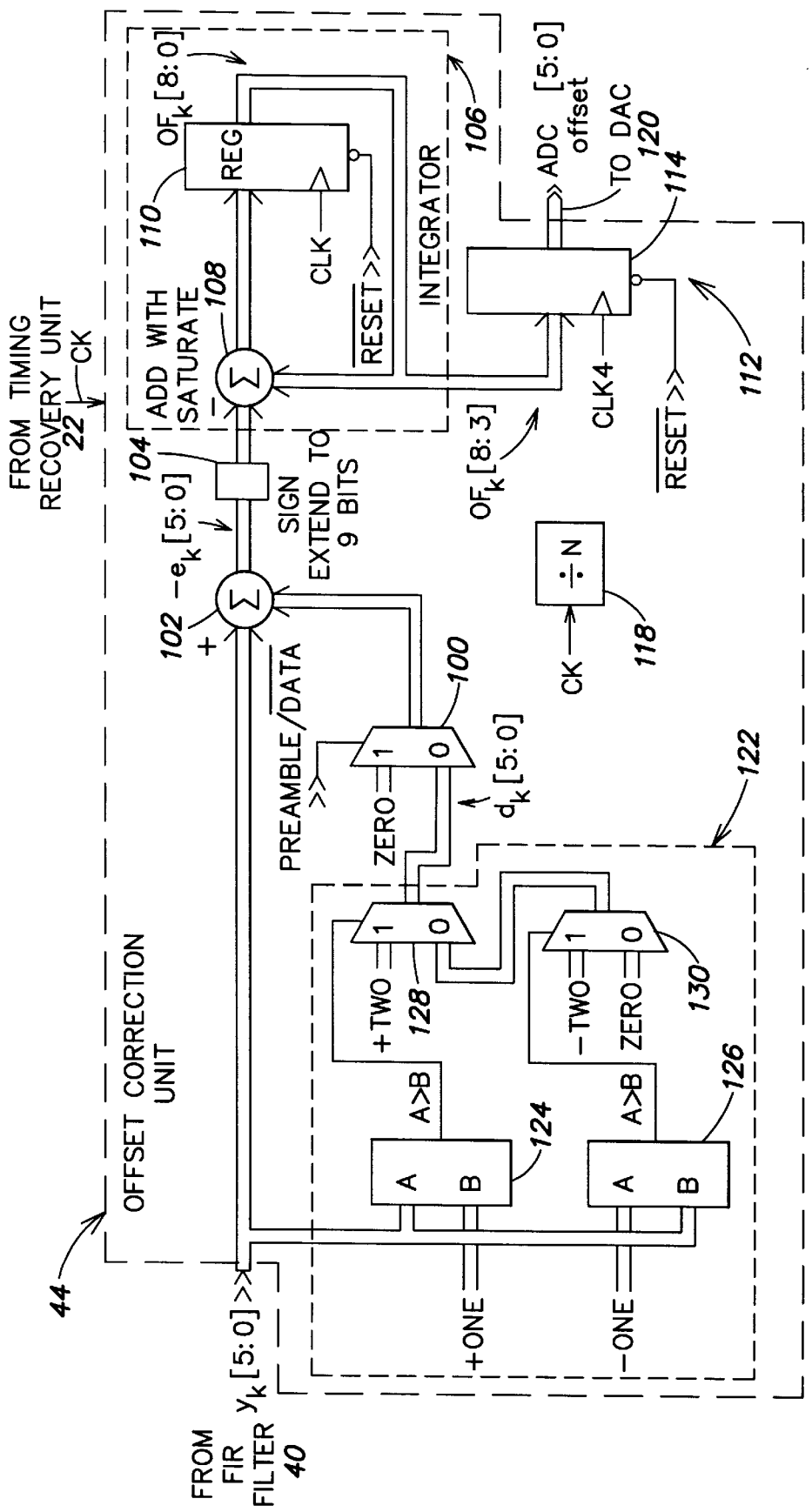
FIG. 4 is a block diagram of an offset correction unit used in the system of FIG. 1.

More particularly, the offset correction unit 44 is shown in more detail in FIG. 4. The offset compensation unit 44 is adapted to operate in a selected one of two modes: a preamble calibration mode; and, a subsequent data recovery mode. The particular one of the two modes is selected by a preamble acquisition/track mode signal fed to a selector 100, as indicated. During the preamble acquisition mode, the control signal (FIG. 4A) fed to selector 100 is a logic 1 thereby coupling the "1" input of the selector 100 (here fed by a zero input) to the output thereof. The output of the selector 100 is fed to a differencing network 102, as indicated. Also fed to the differencing network 102 is the digital words, $y_k$, produced by the equalization filter 40 (FIG. 1) in response to the clock pulses CK (FIG. 4C). Thus, the output of the differencing network 102 may be represented by $-e'_k=y_k$ during the preamble portion of the data acquisition system 10. It is noted that here the digital word $y_k$ is a six bit digital word. In order to process both positive and negative numbers produced by the differencing network 102, twos compliment notation is used. Therefore, a sign bit extender 104 is provided to add an additional three most significant bits to the digital words produced by the differencing network 102 in order to account for the sign of $e'_k$. The output of the sign bit extender 104 (here a nine bit word) is fed to an integrator 106, as indicated. The integrator 106 includes a differencing network 108 and a register 110, fed by the clock pulses, CK, and a RESET signal (FIG. 4B) produced at the start of the preamble acquisition phase. It should be noted that the differencing network 108 is allowed to saturate to a maximum value to prevent overflow. The output of the register 110 is fed to a second input of the differencing network 108. Thus, the integrator 106 is fed by the digital words converted by the analog to digital converter 26 (FIG. 1), after passing through the FIR filter 40 and the differencing network 102 and by the clock pulses CK produced by the timing recovery unit 22 (FIG. 1), for cumulating algebraically adding the digital words $-e'_k$ fed thereto by the differencing network 102 in response to the clock pulses CK.

The six most significant bits of the digital words produced at the output of the integrator 106, i.e., the output of the register 110, are fed to a logic device 112, here a register, or latch 114. Also fed to the latch 114 is the output of a divide by N, here divide by four, network 118 which is itself fed by the clock pulses, CK, produced by the timing recovery unit 22 (FIG. 1). Thus, one clock pulse (FIG. 4D) is fed to the clock input of the latch 14 after each sequence of four clock pulses CK produced by the timing recovery unit 22. The latch 114 gates the feedback loop 50 (FIG. 1) to selectively, successively couple each Nth, (i.e., each fourth), digital word fed to the latch 112 by the integrator 110. The other remaining ones of the digital words are inhibited from being to the output of the latch. As described above, the value of each fourth sample of $y_k$ represents the DC offset.

The output of the gate 112 is fed to an digital to analog converter 120 (FIG. 1) included in the feedback loop 52. The digital to analog converter 120 is fed by the digital words coupled to the output of the latch 114 for converting such digital words, i.e, the DC offset, into a corresponding analog signal that provides the feedback signal on line 52 for the differencing network 30.

Figure 4A:
FIGS. 4A–4D are timing diagrams of signals used in the offset correction unit of FIG. 4.
Figure 4B:
Figure 4C:
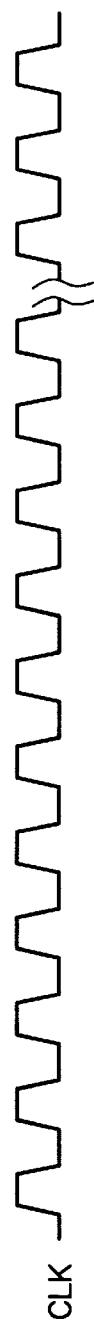
Figure 4D:
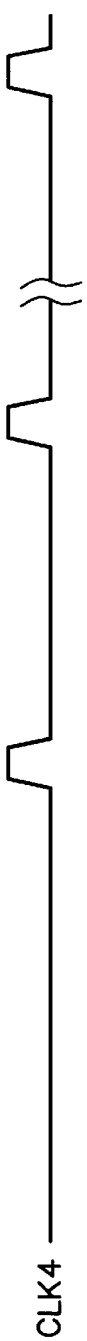

During the data acquisition phase, subsequent to the preamble phase, the preamble acquisition/tracking signal is a logic 0, as shown in FIG. 4A, to decouple input "1" of selector 100 from the output and to couple input "0" to such output. The "0" input is fed by a logic network 122 which includes comparators 124, 126 and selectors 128, 130 arranged to produce at the "0" input of the selector 100 digital words, $\hat{y}_k$, in accordance with the following equations:

$$\hat{y}_k = +2, \text{ if } y_k \text{ is greater than } +1.0;$$
$$= -2 \text{ if } y_k \text{ is less than } -1.0;$$
$$= 0 \text{ otherwise.}$$

Thus, during the data recovery mode, the error signal $e_k = \hat{y}_k - y_k$.

Other embodiments are within the spirit and scope of the appended claims. For example, the DC offset correction unit 44 may be fed by the input to the FIR digital filter 40 during the preamble acquisition mode and then by the output of the FIR digital filter 40 during the data recovery phase. Further, the divide by N network 118 may be by-passed during the data recovery mode to enable each digital word produced by the integrator 106 in response to each one of the clock pulses CK to pass through the gate 112 to the digital to analog converter 120.

What is claimed is:

1. A data recovery system, to recover data, represented by a sequence of data pulses, having a d.c. offset comprising a sequence of preamble pulses fed to the system during a preamble acquisition mode and a sequence of data pulses fed to the system during a subsequent data recovery mode, such system comprising:

a negative feedback loop, having a differencing network fed by the data pulses and a feedback signal representative of the DC offset component, such differencing network removing the DC offset component in response to only actual values of data pulses fed thereto during the preamble acquisition mode and in response to both actual data pulses and estimated values of such data pulses fed thereto during the data recovery mode.

2. The system recited in claim 1 wherein the feedback loop includes:

an analog to digital converter fed by the output signal and clock pulses for converting samples of such output signals into corresponding digital words in response to the clock pulses;

an integrator fed by the digital words converted by the analog to digital converter and the clock pulses for cumulating algebraically adding the digital words fed thereto in response to the clock pulses; and a gate for, during the preamble acquisition mode, selectively successively coupling to an output of the gate each Nth digital word fed to such gate by the integrator where N is an integer greater than one, such gate inhibiting from such output other ones of the digital words;

a digital to analog converter fed by the digital words coupled to the output of the gate for converting such digital words into a corresponding analog signal to provide the feedback signal for the differencing network.

3. A data recovery system, such data being represented by a sequence of data pulses comprising a predetermined sequence of preamble pulses fed to the system during a preamble acquisition mode followed by the sequence of data pulses fed to the system during a subsequent data recovery mode, such data having desired data pulses and a DC offset component, each one of such data pulses having during the preamble acquisition mode a predetermined period, 4T, such system comprising:

a clock for producing clock pulses at a predetermined rate, R, where R=1/T;

a negative feedback loop, having a differencing network fed by the data pulses and a feedback signal representative of the DC offset component, such differencing network removing the DC offset component from the data pulses fed thereto to produce an output signal representative of the desired data pulses, such feedback loop having:

an analog to digital converter fed by the output signal and the clock pulses for converting samples of such output signals into corresponding digital words in response to the clock pulses;

an integrator fed by the digital words converted by the analog to digital converter and the clock pulses for cumulating algebraically adding the digital words fed thereto in response to the clock pulses;

a gate for, during the preamble acquisition mode, selectively successively coupling to an output of the gate each Nth digital word fed to such gate by the integrator where N is an integer greater than one, such gate inhibiting from such output other ones of the digital words; and a digital to analog converter fed by the digital words coupled to the output of the gate for converting such digital words into a corresponding analog signal to provide the feedback signal for the differencing network.

* * * * *

UNITED STATES PATENT AND TRADEMARK OFFICE
CERTIFICATE OF CORRECTION

PATENT NO. : 6,332,205 B1
DATED : December 18, 2001
INVENTOR(S) : Thomas Conway

It is certified that error appears in the above-identified patent and that said Letters Patent is hereby corrected as shown below:

Column 1,
Lines 35-43, should read:
-- Direct current (DC) offsets may be introduced into the data recovery process by analog signal processing circuitry, such as amplifiers and filters. The DC offsets of these devices may vary as a function of temperature and signal gain. The DC offset associated with these non-ideal devices results in a signal level shift which, if uncorrected can degrade performance of the data recovery system. One technique suggested to compensate for this DC offset is discussed in U.S. Patent No. 5,459,679. --

Column 2,
Lines 53-67, should read:
-- Referring now to FIG. 1, a block diagram of a data recovery system 10 is shown. The system 10 is used to recover data that is stored on a magnetic disk 12. The magnetic disk 12 rotates relative to a magnetic field detecting head 13 and data stored on the disk 12 is converted by the head 13 into data pulses. The data is read from the disk and passed through a preamplifier 14 and variable gain amplifier 16 as shown. An exemplary bit of data will have waveforms as shown in FIG. 1A after passing through the preamplifier 14 and variable gain amplifier 16. (It should be understood that, in practice, as with a class 4 partial response (PR4) data recovery system, more than one bit of binary data is read from the disk 12 within the time duration of the pulse produced from a single bit. Here, each data pulse has a time duration 4T). --

UNITED STATES PATENT AND TRADEMARK OFFICE
CERTIFICATE OF CORRECTION

PATENT NO. : 6,332,205 B1
DATED : December 18, 2001
INVENTOR(S) : Thomas Conway

It is certified that error appears in the above-identified patent and that said Letters Patent is hereby corrected as shown below:

Column 3,
Lines 11-28, should read:
-- The data pulses produced at the output of the analog equalization filter 20 have an initial preamble calibration sequence followed by a data sequence that is to be recovered. Thus, when data is read from the disk 12, the preamble is used by a read channel of the storage system (not shown) during the preamble recovery mode (i.e., during the preamble calibration phase) to obtain clock (i.e., sampling or timing) pulses "CK" for a subsequent data recovery mode in a timing recovery unit 22 here of the type described in co-pending patent application entitled "DATA RECOVERY SYSTEM" assigned to the same assignee as the present patent application and filed on the same date as this application, the entire subject matter thereof being incorporated into this application by reference. Suffice it here to say that the data pulses read from the disk 12 have desired data pulses indicated by the solid line 24 in FIG. 1B' and a time varying DC offset component indicated by the dotted line 28 in FIG. 1B'. --

Lines 29-51, should read:
-- The output of the analog equalization filter 20 is fed to a analog to digital converter 26 through a differencing network 30, as shown. Also fed to the differencing network 30 is a feedback signal on line 52. As will be described in more detail below, the signal on line 52 represents the time varying DC offset component of the data pulses fed to the differencing network 30 by the analog equalization filter 20. Thus, the output of the differencing network 30 (i.e., point C) is a compensated difference signal which includes the desired data pulses, as shown in FIG. 1C. --

Column 3, line 57 to column 4,
Line 4, should read:
-- During a read operation, the preamble is used by the timing recovery unit 22 to lock the frequency of the clock pulses CK fed to the analog to digital converter 26 to the preamble frequency, $f_p$, and also to lock the phase of the clock pulses CK to a predetermined phase of the preamble frequency, $f_p$. This timing recovery operation is described in the above referenced co-pending patent application. Suffice it to say here, however, that during the steady-state portion of the preamble phase (FIG. 1D), the clock pulses CK should be synchronized with the desired data pulses such that there are two samples of equal magnitude during the first half cycle of a preamble data pulse and two samples of equal magnitude during last half cycle of such preamble data pulse, as shown in FIG. 1D, where T is the period of the clock pulses CK when phase locked. --

UNITED STATES PATENT AND TRADEMARK OFFICE
CERTIFICATE OF CORRECTION

PATENT NO. : 6,332,205 B1
DATED : December 18, 2001
INVENTOR(S) : Thomas Conway

It is certified that error appears in the above-identified patent and that said Letters Patent is hereby corrected as shown below:

Column 5,
Lines 21-41, should read:
-- Referring now to FIG. 3, an example of samples with again no DC offset but improper sampling, (i.e., the clock pulses CK are shifted ninety degrees from the example shown in FIG. 2) is shown. The sample ($S_A$) is 0 and sample $S_B$ is $2\sqrt{2}$. Likewise, sample $S_C$ is 0 and sample $S_D$ is $2\sqrt{2}$ and so forth. Thus, in this example, the values of $e'_k = -y_k$ are 0, -1.4, 0, 1.4, 0, -1.4, .... The integration of $e'_k$ will be, at each clock pulse CK, 0, -1.4, -1.4, 0, 0, -1.4, -1.4, 0 ... It is noted here again that the integration result is 0 after each fourth clock pulse CK, assuming no d.c offset and the first clock pulse CK is not phase locked to the preamble data pulse. Thus, at both extremes, i.e., perfect phase lock and "perfect non-phase lock", the integration of $e'_k$ results in a 0 at each fourth clock pulse CK with an assumed zero DC offset condition. Therefore, if the value of the integration at each fourth clock pulse is something other than zero, this non-zero value can be attributable to a DC offset. Hence, the value of the integration at each fourth clock pulse CK represents the DC offset and is used as the feedback signal on line 52 (FIG. 1) to cancel the DC offset component of the data pulses fed to the differencing network 30. --

Lines 42-65, should read:
-- More particularly, the data recovery system 10 includes a negative feedback loop 50 for cancelling the DC offset component of the data pulses read from the disk 12. As noted above, the data read from the disk 12 is represented by a sequence of data pulses comprising a predetermined sequence of preamble pulses fed to the data recovery system during a preamble acquisition mode followed by the sequence of data pulses fed to the system during a subsequent data recovery mode. As shown and discussed in connection with FIG. 1B', the data pulses have desired data pulses, as indicted by the solid line 24, and the DC offset component indicated by the dotted line 28. Each one of the data pulses has during the preamble acquisition mode, as noted above, a predetermined period, 4T. The data recovery system 10 includes a source of clock pulses, CK, here the timing recovery unit 22, for producing clock pulses, CK at a predetermined rate, R, where R = 1/T. Also, included in the negative feedback loop 50 is the differencing network 30 fed by the data pulses produced by the equalization filter 20 and a feedback signal on line 52 representative of the DC offset component produced by the offset correction unit 44. The differencing network 30 removes the DC offset component from the data pulses fed thereto to produce output signal representative of the desired data pulses. --

UNITED STATES PATENT AND TRADEMARK OFFICE
CERTIFICATE OF CORRECTION

PATENT NO. : 6,332,205 B1
DATED : December 18, 2001
INVENTOR(S) : Thomas Conway

It is certified that error appears in the above-identified patent and that said Letters Patent is hereby corrected as shown below:

Column 5, line 66 to column 6,
Lines 37, should read:
-- More particularly, the offset correction unit 44 is shown in more detail in FIG. 4. The offset compensation unit 44 is adapted to operate in a selected one of two modes: a preamble calibration mode; and, a subsequent data recovery mode. The particular one of the two modes is selected by a preamble acquisition/track mode signal fed to a selector 100, as indicated. During the preamble acquisition mode, the control signal (FIG. 4A) fed to selector 100 is a logic 1 thereby coupling the "1" input of the selector 100 (here fed by a zero input) to the output thereof. The output of the selector 100 is fed to the differencing network 102, as indicated. Also fed to the differencing network 102 is the digital words, $y_k$, produced by the FIR filter 40 (FIG.1) in response to the clock pulses CK (FIG. 4C). Thus, the output of the differencing network 102 may be represented by $-e'_k=y_k$ during the preamble portion of the data acquisition system 10. It is noted that here the digital word $y_k$ is a six bit digital word. In order to process both positive and negative numbers produced by the differencing network 102, twos compliment notation is used. Therefore, a sign bit extender 104 is provided to add an additional three most significant bits to the digital words produced by the differencing network 102 in order to account for the sign of $e'_k$. The output of the sign bit extender 104 (here a nine bit word) is fed to an integrator 106, as indicated. The integrator 106 includes a differencing network 108 and a register 110, fed by the clock pulses, CK, and a RESET signal (FIG. 4B) produced at the start of the preamble acquisition phase. It should be noted that the differencing network 108 is allowed to saturate to a maximum value to prevent overflow. The output of the register 110 is fed to a second input of the differencing network 108. Thus, the integrator 106 is fed by the digital words converted by the analog to digital converter 26 (FIG. 1), after passing through the FIR filter 40 and the differencing network 102 and by the clock pulses CK produced by the timing recovery unit 22 (FIG. 1), for cumulating algebraically adding the digital words $-e'_k$ fed thereto by the differencing network 102 in response to the clock pulses CK. --

UNITED STATES PATENT AND TRADEMARK OFFICE
CERTIFICATE OF CORRECTION

PATENT NO. : 6,332,205 B1
DATED : December 18, 2001
INVENTOR(S) : Thomas Conway

It is certified that error appears in the above-identified patent and that said Letters Patent is hereby corrected as shown below:

Column 6,
Lines 38-52, should read:
-- The six most significant bits of the digital words produced at the output of the integrator 106, i.e., the output of the register 110, are fed to a logic device 112, here a register, or latch 114. Also fed to the latch 114 is the output of a divide by N, here divide by four, network 118 which is itself fed by the clock pulses, CK produced by the timing recovery unit 22 (FIG. 1). Thus, one clock pulse (FIG. 4D) is fed to the clock input of the latch 14 after each sequence of four clock pulses CK, produced by the timing recovery unit 22. The latch 114 gates the feedback loop 50 (FIG. 1) to selectively, successively couple each Nth, (i.e., each fourth), digital word fed to the latch 112 by the integrator 110. The other remaining ones of the digital words are inhibited from being fed to the output of the latch. As described above, the value of each fourth sample of $y_k$ represents to the DC offset. --

Lines 53-59, should read:
-- The output of the gate 112 is fed to a digital to analog converter 120 (FIG. 1) included in the feedback loop 52. The digital to analog converter 120 is fed by the digital words coupled to the output of the latch 114 for converting such digital words, i.e., the DC offset, into a corresponding analog signal that provides to feedback signal on line 52 for the differencing network 30. --

Signed and Sealed this

Fourteenth Day of May, 2002

*Attest:*

*Attesting Officer*

JAMES E. ROGAN
*Director of the United States Patent and Trademark Office*